United States Patent

[11] 3,554,334

| [72] | Inventors | Keizo Shimano;<br>Yuji Fujii, c/o Shimano Industry Company,<br>No. 77, 3 Cho Oimatu-Cho, Sakai, Japan |
|---|---|---|
| [21] | Appl. No. | 788,768 |
| [22] | Filed | Jan. 3, 1969 |
| [45] | Patented | Jan. 12, 1971 |
| [32] | Priority | June 17, 1968 |
| [33] | | Japan |
| [31] | | 51037/68 and 51038/68 |

[54] HYDRAULIC BICYCLE BRAKE SYSTEM
2 Claims, 1 Drawing Fig.

[52] U.S. Cl. ................................................. 188/152
[51] Int. Cl. ........................................... B60z 11/24
[50] Field of Search ................................. 188/152.01,
152.02, 152.11, 24(Inquired)

[56] References Cited
UNITED STATES PATENTS
2,135,003  11/1938  Harrison ................ 188/152(.11)
2,144,020  1/1939   Hunt .................... 188/152(.11)
3,220,189  11/1965  Caramanna ........... 188/152(.02)X
3,332,240  7/1967   Rise ..................... 188/152(.02)X
3,350,883  11/1967  Rohlfs .................. 188/152(.02)X FOREIGN PATENTS
971,062   6/1950   France .................. 188/152(.01)
201,490   2/1939   Switzerland ........... 188/152(.01)

Primary Examiner—George E. A. Halvosa
Attorney—Moonray Kojima

ABSTRACT: A hydraulic bicycle brake system comprising a master cylinder having dual chambers and dual pistons associated respectively therewith, with each operating in sequence the rear and front wheels against different tension springs on the respective wheel brake unit, with provision in the master cylinder construction for operating either wheel brake in the event fluid should leak from the other cylinder.

PATENTED JAN 12 1971
3,554,334
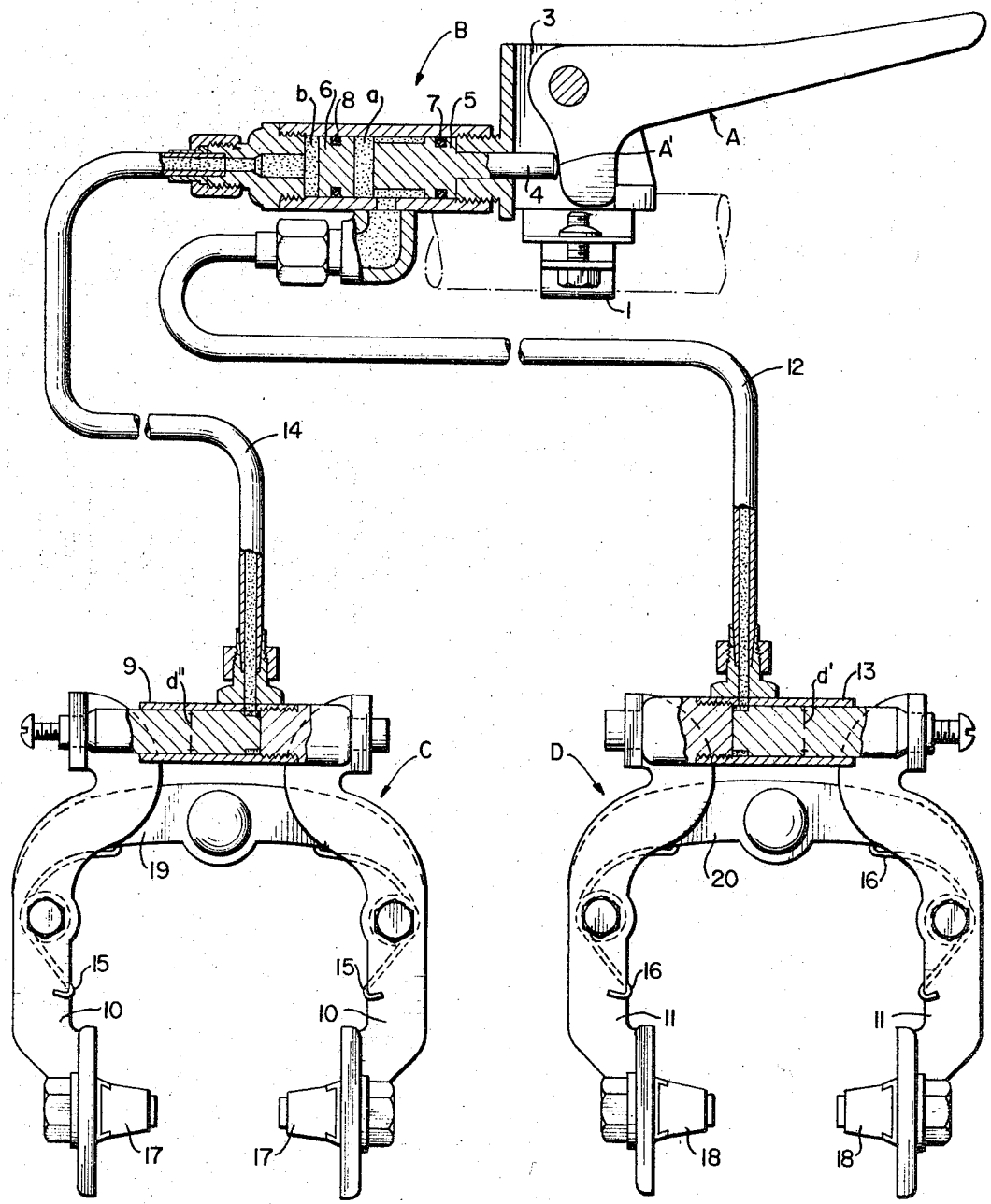
INVENTORS
KEIZO SHIMANO
YUJI FUJII
BY Moonray Kojima
ATTORNEY

HYDRAULIC BICYCLE BRAKE SYSTEM

This invention mainly relates to an improved type of the hydraulic bicycle brake system in general use. Conventionally speaking, many kinds of fluid pressure brake systems have been applied for the purpose. But among these systems there is a common feature that both the brake lever and the brake cylinder have to be provided independently on the front wheel and the rear wheel of the bicycle respectively. As is well known in case of braking the bicycle or the like, there is a jeopardy that a cycler happens to tumble off if he brakes the front wheel only, since the rear wheel will easily lose balance, especially when he is riding down along an incline or when he tries to bring the bicycle to a sudden halt.

On the other hand, it is also well known that the conspicuous brake effect which is obtainable when the rear wheel is applied the brake cannot be always obtained when the front wheel is put on the brake, even though the equal amount of the brake power that is given to the rear wheel is given to the front wheel, and consequently the most secured brake effect cannot be expected as long as the rear wheel only is applied the brake.

Incidentally the system of such a conventional type that necessitates to operate the front wheel independently of the rear wheel is prone to bring about the hazards that the cycler, when driving the bicycle in single hand, might brake the front wheel only by mistake of timely manipulation and tumble over or go to dash against obstacles because he cannot exactly bring it to a stop.

In addition to the above-mentioned hazards caused by the wrong manipulation of the brake unit for either the front wheel or the rear wheel at a different time, the conventional brake system is often attended with an inadvertent mistake by which the front wheel is applied the brake with greater power then the rear wheel is, just because these two brake units operate independently of each other and as a result both the front wheel and the rear wheel lose balance, whereby the cycler tumbles over the bicycle.

Moreover, when the cycler operate the brake lever with one hand, either of the front wheel brake unit or the rear wheel brake unit is put into operation. Thus the exact brake function is not obtained by the front wheel brake unit if the front wheel only is applied the brake. On the contrary, however, the cycler has to suffer the risk of tumbling over the bicycle if he applies the brake to the rear wheel only.

Thus the present invention aims at eliminating these deficiencies, having as one of its principal objectives a provision of the hydraulic brake unit which enables the cycler to operate both of the front wheel and the rear wheel in a safe and exact manner even when he manipulates the brake lever with one hand, namely through his manipulation of a single brake lever.

To give a fuller understanding, an attempt is made by this invention to provide such a hydraulic brake system which can brake the bicycle in safety on an incline or freely bring it to a sudden stop.

Another objective of the invention is to provide the hydraulic brake unit that can be operated by means of a single brake lever in order to brake both the front wheel and the rear wheel at the same time, and that the rear wheel can be braked with greater power than the front wheel is.

The fluid pressure brake system of the present invention is characterized in that it can be applied to both the front wheel and the rear wheel by merely manipulating a single brake lever, wherein the restorable spring for the front wheel brake unit is made more resilient than the restorable spring for the rear wheel brake unit so that the rear wheel brake unit can function in priority of the front wheel brake unit.

This invention is also featured with the slave cylinder of the rear wheel brake unit, whose brake functioning area ranges larger than that of the slave cylinder of the front wheel whereby the brake power of the rear wheel brake unit is made bigger than that of the front wheel brake unit.

The accompanying single FIG. of the drawing depicts an illustrative embodiment of the invention.

This invention, as is definitely shown in the drawings, is constituted with a brake lever A mounted on any free portion of a frame such for example as the handle bar of the bicycle, with a master cylinder B provided adjacent said brake lever A and with a pair of brake units C and D. Said brake lever A is pivotally supported on a bracket 3 fixed in a desired place of the handle bar or the like by means of a fixing element 1. When the brake lever A is gripped with hand, this is moved around its pivoted point as its center and the cam portion A' thereof is moved toward a determined direction. The structure of this brake lever A is not of a special and novel type, and replaceable with any other preferable structure which are not shown herein.

The master cylinder B includes therein a master piston 5 having a piston rod 4 whose foremost end gets into contact with the cam portion A' of the brake lever A and is driven along with the movement of this lever A. Said master cylinder B includes also therein a movable piston 6 which is moved under the influence of the fluid pressure produced by the movement of the master piston 5 since said movable piston 6 is not provided with such a rod as said piston rod 4 and is freely rotatory at the direction of the axis of the master cylinder B.

Between this master piston 5 and the slave piston 6, and also between the inner spherical surface of both the ends of the cylinder 2 and the slave piston 6 there are formed a pair of cylinder rooms $a$ and $b$ each independently sealed up with packings 7 and 8 of an O-shape or the like.

On a pair of the brake units C and D for the front wheel and the rear wheel there are slidably supported through the supporting rods 19, 20 the sliding rods 10 and 11 opposed to each other and provided with brake shoes 17 and 18 faced inwardly. Within each interval between said slidable rods 10 and 11 are mounted slave cylinder 9 and 13. Between the slidable rods 10, 11 and the supporting rods 19, 20 there are respectively provided restorable springs 15 and 16.

The cylinder room $a$, namely one of said two cylinder rooms $a$ and $b$ is communicated by means of a flexible conduit 12 with the cylinder room of the slave cylinder 13 provided in the brake unit D for the rear wheel. Said cylinder room $b$ and the cylinder room of the slave cylinder 9 provided in the front wheel brake unit C are communicated with each other by means of another conduit 14. These cylinder rooms and conduit are filled with such a kind of fluid as oil.

In the hydraulic bicycle brake system of the invention, the resiliency of the restorable spring 15 of said front wheel brake unit C is made stronger than that of the restorable spring 11 of the rear wheel brake unit D. Therefore, when the brake lever 2 is manually gripped, the rod 4 of the master piston 5 is projected by means of the can portion A' to transfer said master piston 5, thereby forcing out the fluid of the cylinder room $a$ into the cylinder room of the valve cylinder 13 through the conduit 14, attended with a result that the rear wheel brake unit D acts against the resiliency of the restorable spring 16 thereof. On the other hand, the slave piston 6 is moved along with the movement of said piston 5 under the influence of the fluid pressure brought about by said movement and forces out the fluid of the cylinder room 6 into the conduit 12, through which then said slave piston 6 is transferred into the cylinder room of the slave cylinder 9, consequently acting the brake unit C of the front wheel against the resiliency of the restorable spring 15.

However, as the restorable spring 15 of the front wheel brake unit C is originally made more resilient than the spring 16 of the rear wheel brake unit D, the difference in resiliency between these two restorable springs 15 and 16 acts as a resistance upon the fluid being forced out from the front wheel, whereby the fluid is projected into the conduit 14 from the cylinder room $b$ with that much delay.

On the contrary, the master cylinder 13 for the rear wheel brake unit 2 can force out the fluid into its room much faster than the slave cylinder 9, due to the lackness of resistance, so that the rear wheel brake unit D commences its brake operation much earlier than the front wheel brake unit C. By arranging each brake unit in the aforementioned manner it is possible to operate the rear wheel brake unit D prior to the operation of the front wheel brake unit C.

By this arrangement it is also to be noted that the cross section surface $d'$ of the master cylinder 13 of the rear wheel brake unit D is made larger than the cross section surface $d''$ of the slave cylinder 9 of the front wheel brake unit C. Apart of this difference between said section surfaces $d'$ and $d''$, it is also possible in this arrangement to keep these cross section surfaces in equal relation with each other and yet form a singularity or plurality of projections on the reciprocating surface of the pistons mounted in said slave cylinders 9 and 13 so that the foremost ends thereof are projected outwardly of the cylinders.

In short, these are all made possible by arranging each slave cylinder of the front wheel brake unit and the rear wheel brake unit in such a manner that its effectively functioning area is made larger in the rear wheel than in the front wheel. Accordingly, when the brake lever 2 is gripped with hand, the rod 4 of the master piston 5 is forced out by means of the cam portion A' to press out the fluid of the cylinder room $a$ into the cylinder room of the slave cylinder 13 through the conduit 12, thereby operating the rear wheel brake unit D.

On the other hand, the movable piston 6 is also transferred along with the movement of the master piston 5 under the influence of the fluid pressure produced thereby and delivers the fluid of the cylinder room $b$ into the cylinder room of the slave cylinder 9 through the conduit 14, thus resultantly operating the front wheel brake unit C. In this case, arrangement being made so that the effectively functioning area $d'$ of the slave cylinder 13 of the rear wheel brake unit D occupies a larger space than the effectively functioning area $d''$ of the slave cylinder 9 of the front wheel brake unit C, the brake power of the rear wheel brake unit D turns to be greater than that of the rear wheel brake unit C, thereby making it possible to apply the well-balanced brake to the bicycle in a safe and reliable manner.

As has been mentioned, according to the method of the present invention it is possible as one of its novelest features to mount a single brake lever on the frame of the bicycle, and communicate through means of a flexible conduit the master cylinder room of the brake lever with the slave cylinder rooms of the front and rear wheel brake units, thereby enclosing the fluid into these cylinders and conduits.

According to the present invention it is also possible to construct the hydraulic bicycle brake system in such a manner as to make the restorable spring for the front wheel brake unit more resilient than the restorable spring for the rear wheel brake unit so that the latter unit works braking in priority of the former unit when said brake lever is just manipulated.

Furthermore, another novelest feature of the invention lies in giving more powerful brake effect to the rear wheel brake unit than to the front wheel brake unit by arranging the effectively functioning area of the rear wheel brake unit much larger than that of the front wheel brake unit thereby making it possible not only to operate the front and rear wheel brake units at the same time, but also to operate the rear wheel brake unit only in priority of the front wheel brake unit, with a result of giving more powerful brake effect to the rear wheel than to the front wheel.

Accordingly, the jeopardy can be disrooted that the bicycle is often tumbled off forwardly when the cycler brakes the front wheel only inadvertently with the intention of bringing the bicycle to a sudden halt.

According to the system of the present invention, the braking potential reserved by the brake operation of the rear wheel is additionally transmitted to the brake operation of the front wheel when the brake is applied thereto. Thus the brake effect is further increased since the front wheel brake normally functions more effectively than the rear wheel when the bicycle wheels at low speed.

If the construction of the system is made in such a manner that the front wheel brake is more powerful than the rear wheel brake, then a combined constitution of the front wheel and the rear wheel brake units further enhance the safety and reliability of the brake operation. Moreover, since it is optionally possible to change the effectively functioning area of each slave cylinder of the front and rear wheel brake units, the braking potential to be transmitted from the rear wheel to the front wheel can be previously determined to a suitable value such for example as six to four, thereby making it possible to obtain a highly efficient brake system most suitable to the bicycle.

We claim:

1. In combination:

a cycle having a front wheel and a rear wheel; and a hydraulic brake system comprising:

a master cylinder unit operable by a handle lever, said master cylinder being located on the handle bar of said cycle, and said handle lever being disposed on said handle bar;

a subordinate cylinder unit for each wheel to operate brake means for each wheel, and means for interconnecting said master cylinder unit to each of said subordinate cylinder units; and wherein said master cylinder unit comprises:

1. a hollow cylinder having a first and a second sealed end with a first opening in said first end, a second opening in said second end and at least one third opening in the wall of said hollow cylinder;
2. A slave piston disposed within said hollow cylinder between said third opening and said first opening to form a first chamber between said one end and said slave piston;
3. said interconnecting means connecting said first chamber to one of said subordinate cylinder units associated with said front wheel, through said first opening;
4. first fluid means filling said interconnecting means and said one subordinate cylinder unit and said first chamber;
5. ring means positioned about said slave piston to snugly fit said slave piston within said hollow cylinder wall and to hold said first fluid means within said first chamber;
6. a master piston positioned within said hollow cylinder between said slave piston and said second end to form a second chamber between said slave piston and said master piston with said third opening being located within said second chamber;
7. said interconnecting means connecting said third opening to another of said subordinate cylinder units associated with said rear wheel;
8. second fluid means filling said second chamber and of sufficient amount to fill said interconnecting means and said other subordinate cylinder unit connected thereto;
9. ring means positioned about said master piston to snugly fit said master piston within said cylinder wall and to hold said second fluid means within said second chamber; and
10. said master piston comprising a rod extending through said second opening and moveable by said handle lever, a first section adjacent said rod having a diameter similar to the diameter of said cylinder wall, and a second section of a shape leaving space between said second section and said third opening for the entire length of the permissible travel path of said master piston and of a length sufficient to move said slave piston when said second fluid means has leaked from said second chamber, and to move said second fluid means through said third opening when said first fluid means has leaked from said first chamber; and wherein each of said brake means has a spring associated therewith for restoring said brake means to nonoperated condition, said spring associated with said brake means associated with said front wheel being of greater strength than said spring associated said brake means associated with said rear wheel, whereby operation of said handle lever causes said rod to move said master piston to move said second fluid means through said third opening to cause said other subordinate cylinder unit associated with said rear wheel to operate said brake means associated therewith, before said slave piston moves said first fluid means through said first opening to cause said one subordinate cylinder unit associated with said front wheel to operate said brake means associated therewith.

2. The brake system of claim 1, wherein said other subordinate cylinder unit associated with said rear wheel has a cylinder cross-sectional area larger than the cross-sectional area of the cylinder of said one subordinate cylinder unit associated with said front wheel.